United States Patent
Tang

(10) Patent No.: US 11,617,075 B2
(45) Date of Patent: *Mar. 28, 2023

(54) TERMINAL INFORMATION TRANSFER METHOD AND RELEVANT PRODUCTS

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 15 days.

This patent is subject to a terminal disclaimer.

(21) Appl. No.: 17/091,202

(22) Filed: Nov. 6, 2020

(65) Prior Publication Data

US 2021/0084489 A1 Mar. 18, 2021

Related U.S. Application Data

(63) Continuation of application No. 16/699,873, filed on Dec. 2, 2019, now Pat. No. 11,234,124, which is a (Continued)

(30) Foreign Application Priority Data

| Mar. 5, 2018 | (WO) | ............... PCT/CN2018/078025 |
| Mar. 19, 2018 | (WO) | ............... PCT/CN2018/079508 |
| Mar. 29, 2018 | (WO) | ............... PCT/CN2018/081166 |

(51) Int. Cl.
*H04W 12/033* (2021.01)
*H04W 12/106* (2021.01)
*H04W 84/04* (2009.01)

(52) U.S. Cl.
CPC ....... *H04W 12/033* (2021.01); *H04W 12/106* (2021.01); *H04W 84/042* (2013.01)

(58) Field of Classification Search
CPC H04W 12/033; H04W 12/106; H04W 84/042
See application file for complete search history.

(56) References Cited

U.S. PATENT DOCUMENTS

| 2015/0282142 A1 | 10/2015 | Dahlman et al. |
| 2015/0350874 A1 | 12/2015 | Draznin et al. |
| (Continued) | | |

FOREIGN PATENT DOCUMENTS

| CN | 1874226 | * 12/2006 | ............... H04L 9/32 |
| CN | 106878445 | * 12/2015 | ............. H04L 67/34 |
| (Continued) | | | |

OTHER PUBLICATIONS

Ericsson et al., "UE policies granularity and UE assistance for policy evaluation," 3GPP TSG-SA WG2 Meeting #126, S2-182605 (revision of agreed S2-181399), Feb. 2018, 9 pages. (Year: 2018).*

(Continued)

*Primary Examiner* — Eric T Oberly
(74) *Attorney, Agent, or Firm* — Hodgson Russ LLP

(57) ABSTRACT

Embodiments of the present disclosure disclose a method for transmitting terminal information and a related product. The method includes: receiving, by a first network element included in a network device, first information from a terminal.

9 Claims, 9 Drawing Sheets

Related U.S. Application Data continuation of application No. PCT/CN2018/087361, filed on May 17, 2018.

(56) References Cited

U.S. PATENT DOCUMENTS

| | | | |
|---|---|---|---|
| 2015/0382178 A1* | 12/2015 | Park | H04W 8/183 |
| | | | 455/411 |
| 2018/0368056 A1* | 12/2018 | Wang | H04W 48/18 |
| 2019/0053104 A1* | 2/2019 | Qiao | H04W 28/24 |
| 2019/0174449 A1 | 6/2019 | Shan et al. | |
| 2019/0182654 A1 | 6/2019 | Jerichow et al. | |
| 2020/0296660 A1 | 9/2020 | Wang et al. | |

FOREIGN PATENT DOCUMENTS

| | | |
|---|---|---|
| CN | 106878445 | 6/2017 |
| CN | 107295163 | 10/2017 |
| JP | 2016010072 | 1/2016 |
| JP | 2021510997 | 4/2021 |
| KR | 20110061589 | 6/2011 |
| RU | 2586587 | 6/2016 |
| WO | 2019137553 | 7/2019 |

OTHER PUBLICATIONS

Ericsson et al., "UE policies granularity and UE assistance for policy evaluation," 3GPP TSG-SA WG2 Meeting #126, S2-181612 (revision of agreed S2-181399), Feb. 2018, 9 pages.
FSIP, Office Action for RU Application No. 2019141619/07, dated Jun. 1, 2021.
USPTO, Office Action for U.S. Appl. No. 16/699,873, filed Aug. 10, 2021.
INAPI, Office Action for CL Application No. 201903826, dated Jul. 20, 2021.
KIPO, Office Action for KR Application No. 10-2020-7010667, dated Dec. 2, 2021.
EPO, Communication for EP Application No. 18908766.1, dated Sep. 21, 2021.
Ericsson et al., "UE policies granularity and UE assistance for policy evaluation," 3GPP TSG-SA WG2 Meeting #125, S2-181386, Jan. 2018, 9 pages.
Ericsson et al., "UE policies granularity and UE assistance for policy evaluation," 3GPP TSG-SA Meeting #125, S2-181399 (e-mail revision 4 of S2-181386), Jan. 2018, 14 pages.
Ericsson et al., "UE assisted UE policies calculation in PCF," 3GPP TSG-SA WG2 Meeting #125, S2-180965, Jan. 2018, 10 pages.
Qualcomm Inc, "Handling of Policy synchronization between UE and PCF using policy ID," SA WG2 Meeting #125, S2-180563, Jan. 2018, 3 pages.
CNIPA, First Office Action for CN Application No. 201911328718.2, dated Nov. 3, 2020.
Ericsson et al., "UE policies granularity and UE assistance for policy evaluation," 3GPP TSG-SA WG2 Meeting #126, S2-182605 (revision of agreed S2-181399), Feb. 2018, 9 pages.
EPO, Communication for EP Application No. 18908766.1, dated Mar. 29, 2021.
IPI, Office Action for IN Application No. 201917049210, dated Mar. 25, 2021.
ISDEC, Office Action for CA Application No. 3066040, dated Jan. 28, 2021.
USTPO, Office Action for U.S. Appl. No. 16/699,873, filed Feb. 4, 2021.
EPO, Communication for EP Application No. 18908766.1, dated Mar. 15, 2022.
JPO, Office Action for JP Application No. 2020-520152, dated Mar. 11, 2022.
INAPI, Office action for CL Application No. 201903826, dated Apr. 11, 2022.
KIPO, Office Action for KR Application No. 10-2020-7010667, dated Jun. 16, 2022.
ILPO, Office Action for IL Application No. 271911, dated Sep. 5, 2022.
DGIP, Office Action for ID Application No. P00202000104, dated Jul. 5, 2022.
TIPO, First Office Action for TW Application No. 108107140, dated Nov. 28, 2022.
EPO, Communication for EP Application No. 18908766.1, dated Dec. 7, 2022.
"3rd Generation Partnership Project; Technical Specification Group Services and System Aspects; System Architecture for the 5G System; Stage 2 (Release 15)," 3GPP TS 23.501, Dec. 2017, v15.0.0.

* cited by examiner

| PSI 1 | user ID (SUPI or SUCI or MSISDN or Domain Name) | unique ID 1 |
| --- | --- | --- |
| PSI 2 | user ID (SUPI or SUCI or MSISDN or Domain Name) | unique ID 2 |
| PSI 3 | user ID (SUPI or SUCI or MSISDN or Domain Name) | unique ID 3 |
| PSI 4 | user ID (SUPI or SUCI or MSISDN or Domain Name) | unique ID 4 |

| PSI 1 | PLMN | unique ID 1 |
| --- | --- | --- |
| PSI 2 | PLMN | unique ID 2 |
| PSI 3 | PLMN | unique ID 3 |
| PSI 4 | PLMN | unique ID 4 |

| PSI 1 | unique ID 1 |
| --- | --- |
| PSI 2 | unique ID 2 |
| PSI 3 | unique ID 3 |
| PSI 4 | unique ID 4 |

TERMINAL INFORMATION TRANSFER METHOD AND RELEVANT PRODUCTS

CROSS-REFERENCE TO RELATED APPLICATIONS

This application is a continuation of U.S. application Ser. No. 16/699,873, filed on Dec. 2, 2019, which is a continuation of International Application No. PCT./CN2018/087361, filed on May 17, 2018, which claims priority to International Application No. PCT/CN2018/078025, filed on Mar. 5, 2018, International Application No. PCT/CN2018/079508, filed on Mar. 19, 2018 and International Application No. PCT/CN2018/081166, filed on Mar. 29, 2018. The entire disclosures of the aforementioned applications are incorporated herein by reference.

TECHNICAL FIELD

The present disclosure relates to the field of communication technologies, and more particularly, to a method for transmitting terminal information and a related product.

BACKGROUND

In new radio technologies, policy selection related information transmitted between a network device and a terminal is plaintext in the initial registration of the terminal on a network side, and such mechanism has the risk of exposing privacy information of the terminal.

SUMMARY

Embodiments of the present disclosure provide a method for transmitting terminal information and a related product, which improve the safety of the interaction of information between a network side and a terminal in the inquiring of a terminal policy.

In a first aspect, an embodiment of the present disclosure provides a method for transmitting terminal information which is applied in a network device which includes a first network element. The method includes:

receiving, by the first network element, first information from a terminal, wherein the first information is used to indicate a terminal policy stored in the terminal, and includes content that is not represented in the form of plaintext.

The first network element inquires the terminal policy based on the first information.

In a second aspect, an embodiment of the present disclosure provides a method for transmitting terminal information which is applied in a terminal. The method includes:

receiving, by the terminal, second information from a first network element, wherein the second information is used to indicate a terminal policy stored by the terminal, and includes content that is not represented in the form of plaintext.

The terminal inquires the terminal policy based on the second information.

In a third aspect, an embodiment of the present disclosure provides a network device, which has functions of implementing an action of a first network device in the design of the above methods. The functions may be implemented by hardware or by corresponding software implemented by hardware. The hardware or software includes one or more modules corresponding to the functions described above. In a possible design, the network device includes a processor which is configured to support the network device to perform corresponding functions in the methods described above. Further, the network device may further include a transceiver which supports communication between the network device and the terminal. Further, the network device may further include a memory which is coupled to the processor and stores program instructions and data necessary for the network device.

In a fourth aspect, an embodiment of the present disclosure provides a terminal, which has functions of implementing an action of a first terminal in the design of the above methods. The functions may be implemented by hardware or by corresponding software implemented by hardware. The hardware or software includes one or more modules corresponding to the functions described above. In a possible design, the terminal includes a processor which is configured to support the terminal to perform corresponding functions in the methods described above. Further, the terminal may further include a transceiver which supports communication between the terminal and the network device. Further, the terminal may further include a memory which is coupled to the processor and stores program instructions and data necessary for the terminal.

In a fifth aspect, an embodiment of the present disclosure provides a network device including a processor, a memory, a transceiver and one or more programs. The one or more programs are stored in the memory and executed by the processor, the programs including instructions for performing steps in any of the methods in the first aspect of the embodiment of the present disclosure.

In a sixth aspect, an embodiment of the present disclosure provides a terminal including a processor, a memory, a transceiver and one or more programs. The one or more programs are stored in the memory and executed by the processor, the programs including instructions for performing steps in any of the methods in the second aspect according to the embodiments of the present disclosure.

In a seventh aspect, an embodiment of the present disclosure provides a computer readable storage medium storing computer programs for electronic data exchange, wherein the computer programs cause a computer to perform all or part of the steps described in any of the methods in the first aspect according to the embodiments of the present disclosure.

In an eighth aspect, an embodiment of the present disclosure provides a computer readable storage medium storing computer programs for electronic data exchange, wherein the computer programs cause a computer to perform all or part of the steps described in any of the methods in the second aspect according to the embodiments of the present disclosure.

In a ninth aspect, an embodiment of the present disclosure provides a computer program product which includes a non-transitory computer readable storage medium storing computer programs which are operable to cause a computer to perform all or part of the steps described in any of the methods in the first aspect according to the embodiments of the present disclosure. The computer program product can be a software installation package.

In a tenth aspect, an embodiment of the present disclosure provides a computer program product which includes a non-transitory computer readable storage medium storing computer programs which are operable to cause a computer to perform all or part of the steps described in any of the methods in the second aspect of the embodiment of the present disclosure. The computer program product can be a software installation package.

It can be seen that in the embodiments of the present disclosure, the first network element of the network device firstly receives the first information from the terminal, and secondly inquires the terminal policy based on the first information. Since the first information is non-plaintext content, the first information can be prevented from being illegally stolen and directly utilized during transmission of the first information between the first network element and the terminal, which is beneficial to improving the safety of the interaction of information between the network side and the terminal in the inquiring of the terminal policy.

BRIEF DESCRIPTION OF THE DRAWINGS

Hereinafter, the accompanying drawings to be used in the description of the embodiments or the prior art will be described briefly.

DETAILED DESCRIPTION

Technical solutions in embodiments of the present disclosure will be described below with reference to the accompanying drawings.

Figure 1A:
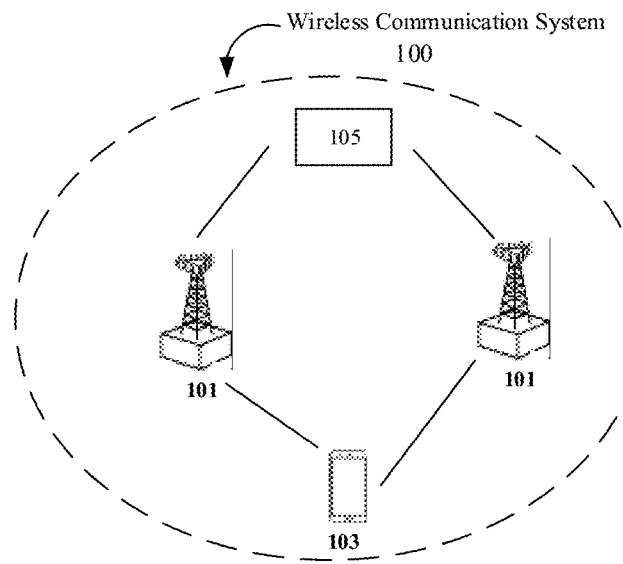
FIG. 1A is a diagram of a network architecture of a possible communication system according to an embodiment of the present disclosure.

FIG. 1A exemplarily illustrates a wireless communication system involved in the present disclosure. A wireless communication system 100 is operated at a high frequency band. The wireless communication system 100 is not limited to a Long Term Evolution (LTE) system, and can also be a future evolution system, such as the $5^{th}$ generation (5G) mobile communication system, a new radio (NR) system, or a Machine to Machine (M2M) communication system. The wireless communication system 100 includes one or more network devices 101, one or more terminals 103 and a core network device 105. The network device 101 may be a base station, which is used to communicate with one or more terminals, or may be used to communicate with one or more base stations having part of terminal functions (e.g. a macro base station and a micro base station). The base station can be a Base Transceiver Station (BTS) in a Time Division Synchronous Code Division Multiple Access (TD-SCDMA) system, an Evolutional Node B (eNB) in a LTE system, or a base station in a 5G system and a new radio (NR) system. Furthermore, the base station can also be an Access Point (AP), a Trans (TRP) node, a Central Unit (CU) or other network entities, and can include all or a part of functions of the above network entities. The core network device 105 includes core network side devices, such as Access and Mobility Management Function (AMF) entities, User Plane Function (UPF) entities and Session Management Function (SMF) entities. The terminal 103 is distributed throughout the wireless communication system 100, either stationarily or movably. In some embodiments of the present disclosure, the terminal 103 may be a mobile device (e.g. a smart phone), a mobile station, a mobile unit, an M2M terminal, a wireless unit, a remote unit, a user agent, a mobile client, and so on.

It should be noted that the wireless communication system 100 is illustrated in FIG. 1A to more clearly describe the technical solutions of the present disclosure, and it does not impose any limitations on the present disclosure. It will be clear to those skilled in the art that the technical solutions of the present disclosure can be equivalently applicable to similar technical problems as the network architectures evolve and new service scenarios emerge.

Related technologies of the present disclosure will be described below.

At present, a terminal policy is referred to as a UE Policy, and includes an access network discovery and selection policy (ANDSP) and a UE Route Selection Policy (URSP). ANDSP is a policy used for selecting a Service Set Identifier (SSID) for Wireless LAN (WLAN) access, and URSP is a policy used for selecting a different packet protocol data unit session (PDU Session). At present, for the UE Policy, a policy section identifier (PSI) parameter has been set up to flexibly recognize the UE Policy. Examples of a WLANSP policy and a URSP policy in a protocol will be given below.

1. Examples of WLANSP

Wireless Local Area Network Selection Policy (WLANSP) rule 1:

Priority 1, Validity Conditions (PLMN 1), Group of Selection Criteria with priority 1: PreferredSSIDList= Priority 1: myoperator1, Priority 2: myoperator2, MinimumBackhaulThreshold=2 Mbps in the downlink, Group of Selection Criteria with priority 2, PreferredSSIDList= Priority 1: myoperator3;

WLANSP rule 2:

Priority 2, Validity Conditions (PLMN 1), Group of Selection Criteria with priority 1: PreferredRoamingPartnerList=Priority 1: partner1.com, Priority 2: partner2.com, MaximumBSSLoad=60.

2. Examples of URSP

URSP rule 1:

Priority: 1, Traffic filter: App=DummyApp, Direct offload: Prohibited, Slice Info: S-NSSAI-a, Continuity Types: SSC Mode 3, DNNs: internet, Access Type: 3GPP access;

URSP rule 2:

Priority: 2, Traffic filter: App=App1, App2, Direct offload: Permitted, Slice Info: S-NSSAI-a, Access Type: Non-3GPP access.

At present, as shown in Tables 1 and 2, for URSP, relevant contents have been specified.

TABLE 1

UE Route Selection Policy Rule

| Information name | Description | Category | PCF permitted to modify in a UE context | Scope |
|---|---|---|---|---|
| Rule Precedence | Determines the order the URSP rule is enforced in the UE. | Mandatory (NOTE 1) | Yes | UE context |
| Traffic descriptor | This part defines the traffic descriptors for the policy | | | |
| Application identifiers | Application identifier(s) | Optional | Yes | UE context |
| Rule Precedence | Determines the order the URSP rule is enforced in the UE. | Mandatory (NOTE 1) | Yes | UE context |
| IP descriptors | IP 3 tuple(s) (destination IP address or IPv6 network prefix, destination port number, protocol ID of the protocol above IP) | Optional | Yes | UE context |
| Non-IP descriptors | Descriptor(s) for non-IP traffic | Optional | Yes | UE context |
| List of Route Selection Descriptors | A list of Route Selection Descriptors. The components of a Route Selection Descriptor are described in table 6.6.2-2 in TS 23.503. | Mandatory | | |

(NOTE 1):
Rules in a URSP shall have different precedence values.

TABLE 2

Route Selection Descriptors

| Information name | Description | Category | PCF permitted to modify in a UE context | Scope |
|---|---|---|---|---|
| Route Selection Descriptor Precedence | Determines the order in which the Route Selection Descriptors are to be applied. | Mandatory (NOTE 1) | Yes | UE context |
| Route selection components | This part defines the route selection components | Mandatory (NOTE 2) | | |
| SSC Mode Selection | One single value of SSC mode. | Optional | Yes | UE context |
| Network Slice Selection | Either one single value or a list of values of S-NSSAI(s). | Optional | Yes | UE context |
| DNN Selection | Either one single value or a list of values of DNN(s). | Optional | Yes | UE context |
| Non-seamless Offload indication | Indicates if the traffic of the matching application is to be offloaded to non-3GPP access outside of a PDU Session. | Optional (NOTE 3) | Yes | UE context |

TABLE 2-continued

Route Selection Descriptors

| Information name | Description | Category | PCF permitted to modify in a UE context | Scope |
|---|---|---|---|---|
| Access Type preference | Indicates the preferred Access Type (3GPP or non-3GPP) when the UE establishes a PDU Session for the matching application. | Optional | Yes | UE context |

(NOTE 1):
Every Route Selection Descriptors in the list shall have a different precedence value.
(NOTE 2):
At least one of the route selection component shall be present.
(NOTE 3):
If this indication is present in a Route Selection Descriptor, no other components shall be included in the Route Selection Descriptor.

Figure 1B:
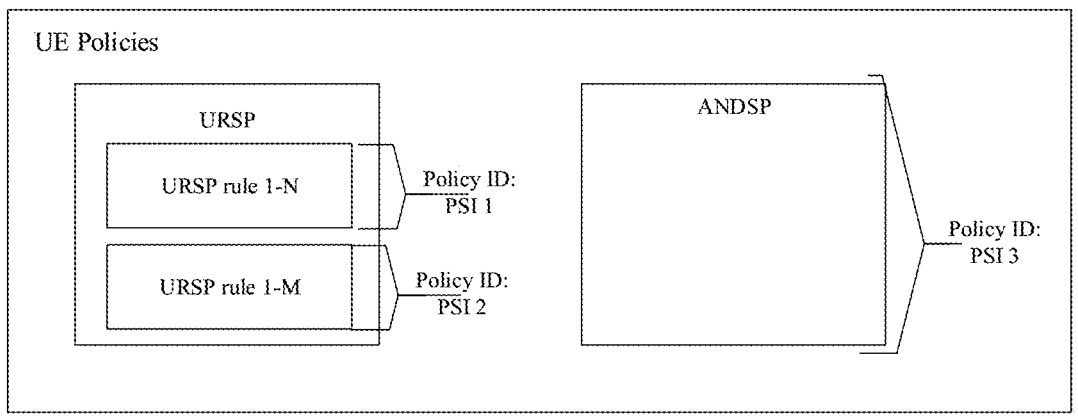
FIG. 1B is a diagram of an example of a relationship between a terminal policy and a PSI parameter according to an embodiment of the present disclosure.

For example, as shown in FIG. 1B, USRP rule 1-N denotes the first part of the UE policy which corresponds to policy ID: PSI1, and USRP rule 1-M denotes the second part of the UE policy which corresponds to policy ID: PSI2, and ANDSP denotes the third part of the UE policy which corresponds to policy ID: PSI3. Therefore, one SUPI generally corresponds to one or more PSIs on a network side. For the use of PSI, a policy section identifier PSI saved in the terminal is added to an initial registration request message to be transmitted to a packet control function (PCF) network element. In this way, the PCF network element may be aware of PSI that is currently stored in the terminal and adjust the UE Policy as required. Since PSI added in the initial registration request message is plaintext, it can be easily intercepted by the other party, which may result in the security issue: the terminal's privacy information is exposed and an attacker may use the information for illegal acts.

In view of the above issue, the following embodiments are provided in the present disclosure, and will be described in detail below with reference to the accompanying drawings.

Figure 2A:
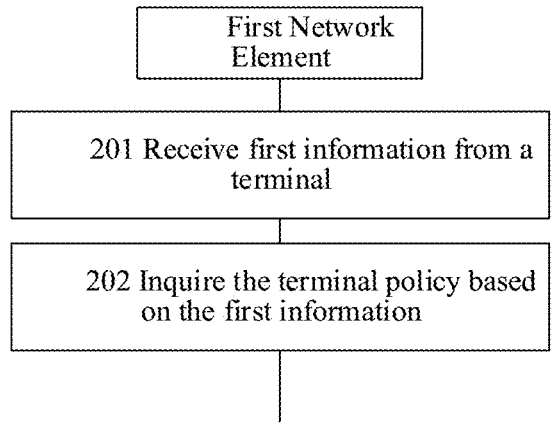
FIG. 2A is a schematic flowchart of a method for transmitting terminal information according to an embodiment of the present disclosure.

FIG. 2A shows a method for transmitting terminal information according to an embodiment of the present disclosure. The method is applied in a network device in the above exemplary communication system, and the network device includes a first network element. The method includes the following steps:

In step 201, the first network element receives first information from a terminal.

The first network element can be a policy control function (PCF) network element. The first information may be transparently transmitted to the PCF network element by the terminal via an access network (RAN) device and an Access and Mobility Management Function (AMF) network element.

The first information is used to indicate a terminal policy stored in the terminal, and includes non-plaintext contents. The non-plaintext contents specifically indicate that contents that are included in the first information and are indicative of a device identifier (corresponding to a user ID) of the terminal are non-plaintext identification information. The non-plaintext identification information specifically can be encrypted information (which is encrypted in the form of SUCI or encrypted by other secret keys such as a first secret key and/or is under integrity protection using a second secret key) or identification information in other format that is in direct association with the terminal policy and that does not directly contain the user ID (e.g. SUPI).

In step 202, the first network element inquires the terminal policy based on the first information.

It can be seen that in the embodiment of the present disclosure, the first network element of the network device firstly receives the first information from the terminal, and secondly inquires the terminal policy based on the first information. Since the first information are non-plaintext contents, the first information can be prevented from being illegally stolen and directly utilized during the transmission of the first information between the first network element and the terminal, which is beneficial to improving the safety of the interaction of information between the network side and the terminal in the inquiring of the terminal policy.

In a possible example, the first information is used to indicate a terminal policy that is stored in the terminal; after the first network element receives the first information from the terminal, the method further includes:

inquiring, by the first network element, the terminal policy based on the first information.

In a possible example, the first information includes a policy section identifier (PSI) list, and each PSI parameter in the PSI list is represented by a user identifier (ID) and a unique ID.

For example, it is assumed that the terminal should include 4 UE policies, which are respectively a first part of the UE policy, a second part of the UE policy, a third part of the UE policy and a fourth part of the UE policy. The first part of the UE policy is identified by PSI1, and the second part of the UE policy is identified by PSI2, and the third part of the UE policy is identified by PSI3, and the fourth part of the UE policy is identified by PSI4. As shown in Table 3, the first information can include a PSI list as shown in Table 3.

TABLE 3

| UE policy of terminal | PSI parameter |
|---|---|
| first part of UE policy | PSI1 |
| second part of UE policy | PSI2 |
| third part of UE policy | PSI3 |
| fourth part of UE policy | PSI4 |

Figures 2B, 2C, 2D, 2E:
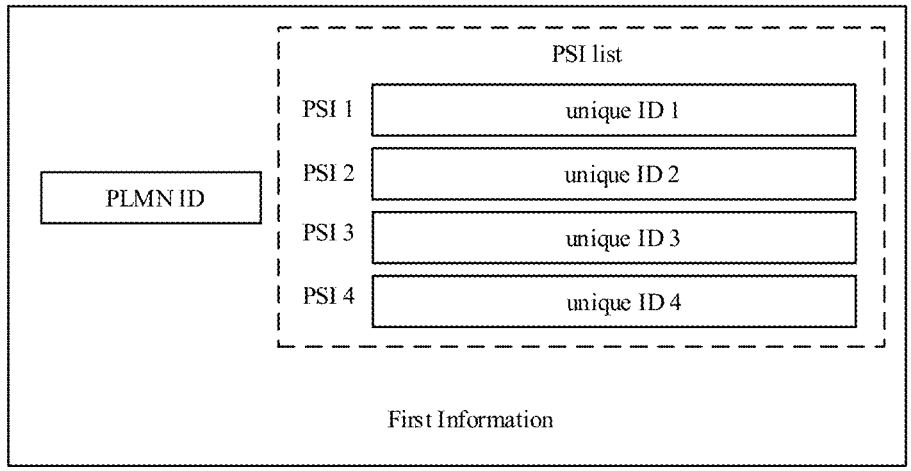
FIG. 2B shows an example format for identifying a PSI parameter of a UE policy according to an embodiment of the present disclosure.
FIG. 2C is another example format for identifying a PSI parameter of a UE policy according to an embodiment of the present disclosure.
FIG. 2D is another example format for identifying a PSI parameter of a UE policy according to an embodiment of the present disclosure.
FIG. 2E is an example format of first information according to an embodiment of the present disclosure.

As shown in FIG. 2B, an example format for identifying a PSI parameter of the UE policy includes a user ID and a unique ID. The user ID may be SUPI or SUCI or MSISDN or Domain Name, and the unique ID1 may be a serial number of the UE policy, for example, the unique ID corresponding to the first part of the UE policy is 1, and the unique ID corresponding to the third part of the UE policy is 3.

As shown in FIG. 2C, another example format for identifying the PSI parameter of the UE policy includes a public land mobile network (PLMN) and a unique ID. The PLMN+ unique ID uniquely identifies the global uniqueness of the corresponding UE policy. There will be a great number of bits in the unique ID (in the order of hundreds of millions) and one SUPI can carry multiple PSI IDs, which has a great impact on the network side.

In a possible example, the first information includes a user ID and a PSI list, and each PSI parameter in the PSI list is represented by a unique ID.

For example, it is assumed that the terminal should include 4 UE policies, which are respectively a first part of the UE policy, a second part of the UE policy, a third part of the UE policy and a fourth part of the UE policy. The first part of the UE policy is identified by unique ID1, the second part of the UE policy is identified by unique ID2, the third part of the UE policy is identified by unique ID3, and the fourth part of the UE policy is identified by unique ID4. As shown in Table 4, the first information can include a PSI list as shown in Table 4.

| UE policy of terminal | PSI parameter |
| --- | --- |
| first part of UE policy | unique ID1 |
| first part of UE policy | unique ID2 |
| third part of UE policy | unique ID 3 |
| fourth part of UE policy | unique ID 4 |

The unique ID is a unique code generated by the network side (e.g. the first network element). The unique code is in one-to-one correspondence to contents corresponding to the PSI. The network side may index the contents corresponding to the PSI based on the unique code.

For example, as shown in FIG. 2D, it is assumed that four PSI parameters of the terminal include PSI1, PSI2, PSI3 and PSI4. The network side generates a unique code for each of the PSI parameters and these unique codes include unique ID1, unique ID2, unique ID3 and unique ID4. Correspondence between the four unique codes and the four PSI parameters may be that PSI1 corresponds to the unique ID1, PSI2 corresponds to the unique ID2, PSI3 corresponds to the unique ID3, and PSI4 corresponds to the unique ID4.

In a possible example, the first information includes a PLMN ID and a PSI list, and each PSI parameter in the PSI list is represented by a unique ID.

For example, it is assumed that the terminal should include four UE policies, which are respectively a first part of the UE policy, a second part of the UE policy, a third part of the UE policy and a fourth part of the UE policy. The first part of the UE policy is identified by the unique ID1, the second part of the UE policy is identified by the unique ID2, the third part of the UE policy is identified by the unique ID3, and the fourth part of the UE policy is identified by the unique ID4. As shown in FIG. 2E, the first information may include a PLMN ID and a PSI list.

In a possible example, the first information includes a PSI list, and each PSI parameter in the PSI list is represented by a PLMN ID and a unique ID.

Figure 2F:
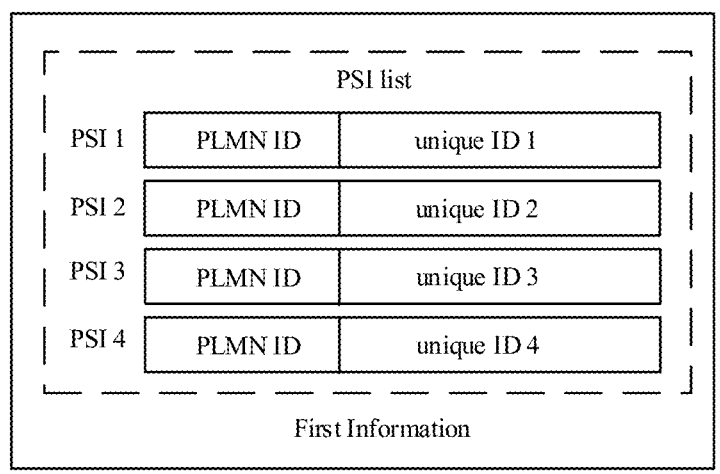
FIG. 2F is another example format of first information according to an embodiment of the present disclosure.

For example, it is assumed that the terminal should include four UE policies, which are respectively a first part of the UE policy, a second part of the UE policy, a third part of the UE policy and a fourth part of the UE policy. The first part of the UE policy is identified by PLMN ID+unique ID1, the second part of the UE policy is identified by PLMN ID+unique ID2, the third part of the UE policy is identified by PLMN ID+unique ID3, and the fourth part of the UE policy is identified by PLMN ID+unique ID4. As shown in FIG. 2F, the first information may include a PSI list as shown in 2F.

In a possible example, PSI parameter(s) in the PSI list is(are) globally unique; or the PSI parameter(s) in the PSI list is(are) unique within the PLMN.

In a possible example, the user ID or the PSI parameter includes any one of a Subscriber Permanent Identifier (SUPI), a Subscriber Concealed Identifier (SUCI), Mobile Subscriber International ISDN/PSTN number (MSISDN) and a Domain Name.

The unique ID is used to indicate any one of a preset number of terminal policies under the constraint of the user ID. When the user ID is SUPI or SUCI, the preset number is less than a preset threshold, which may be 10.

In a possible example, when the user ID is not SUPI, the method further includes:

inquiring, by the first network element, a SUPI value corresponding to the user ID from the second network element.

In a possible example, the second network element has a subscription identifier de-concealing function (SIDF).

In a possible example, inquiring, by the first network element, the terminal policy based on the first information includes:

inquiring, by the first network element, the terminal policy from a third network element using the SUPI and/or the unique ID.

In a possible example, inquiring, by the first network element, the terminal policy based on the first information includes:

directly inquiring, by the first network element, the terminal policy from the third network element using the PSI parameter(s) in the first information reported by the terminal.

In a possible example, the third network element is a core network data storage network element.

In a possible example, the first information is data transmitted to the first network element by the terminal, and a part or all of the data is encrypted by the first secret key and/or is under integrity protection using the second secret key.

In a possible example, the method further includes decrypting and/or checking integrity, by the first network element, based on the first information to obtain the first content.

In a possible example, the method further includes inquiring the terminal policy, by the first network element, based on the first content.

In a possible example, the first secret key or the second secret key is generated by a third secret key via a preset algorithm.

In a possible example, the third secret key is sent to the terminal by a fourth network element.

In a possible example, the fourth network element is an authentication server function (AUSF) network element on the network side.

Figure 2G:
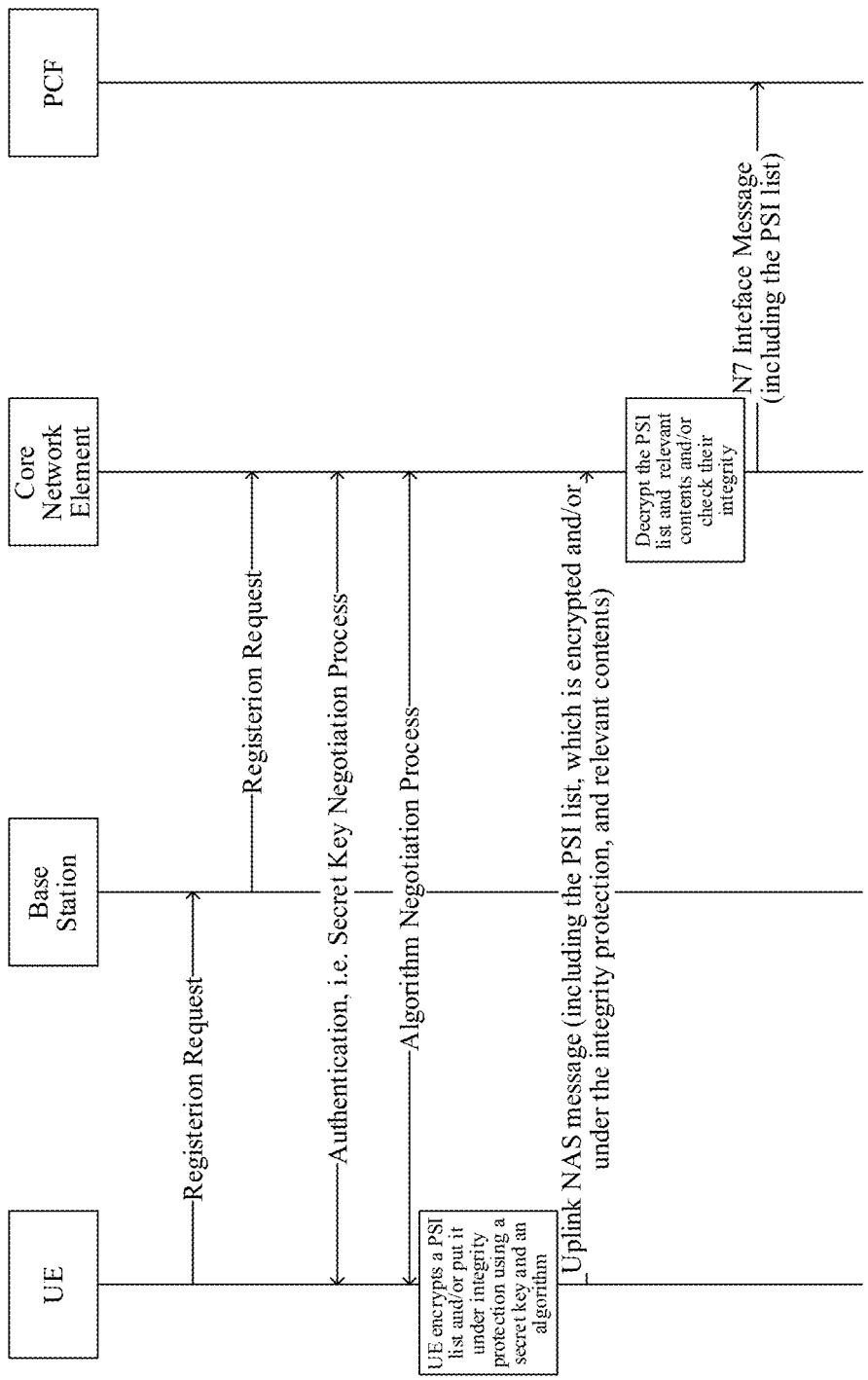
FIG. 2G is an exemplary diagram illustrating the processing of encrypting and transmitting a registration and request message according to an embodiment of the present disclosure.

The process of encrypting and transmitting the PSI list in the registration request message will be illustratively described below with reference to FIG. 2G.

A user equipment (UE) first sends an initial request message (e.g. a registration request message) to a base station.

After receiving the initial request message, the base station forwards it to a core network element.

After receiving the initial request message, the core network element completes a key negotiation process and an algorithm negotiation process in cooperation with the UE.

The UE uses a secret key and an algorithm to encrypt and/or carry out the integrity protection of the PSI list, and sends the encrypted and/or integrity-protected PSI list and related contents to the core network element through an uplink non-access stratum (NAS) message.

After receiving the NAS message, the core network element performs the decryption and/or integrity check of the PSI list and related contents, and at last sends the decrypted PSI list and related contents to a PCF network element through a specific interface (e.g. an N7 interface).

In a possible example, the first secret key is pre-configured at the first network element and the terminal.

Figure 3A:
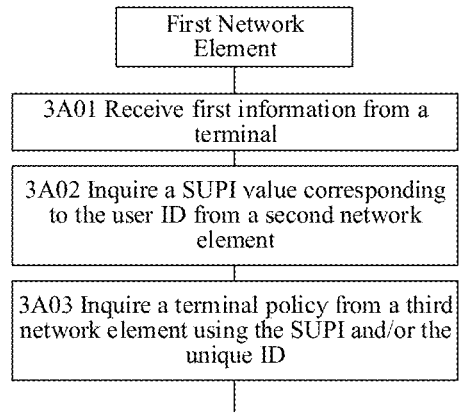
FIG. 3A is a schematic flowchart of a method for transmitting terminal information according to an embodiment of the present disclosure.

Correspondingly with the embodiment shown in FIG. 2A, FIG. 3A shows another method for transmitting terminal information according to an embodiment of the present disclosure. The method is applied in a network device in the foregoing exemplary communication system, and the network device includes a first network element. The method includes the following steps:

In step 3A01, the first network element receives first information from a terminal.

The first information includes a policy section identifier (PSI) list, and each PSI parameter in the PSI list is represented by a user identifier (ID) and a unique ID. The first information alternatively includes a user ID and a PSI list, and each PSI parameter in the PSI list is represented by a unique ID. PSI parameter(s) in the PSI list is(are) globally unique; or PSI parameter(s) in the PSI list is(are) unique within a PLMN.

The user ID or the PSI parameter include any one of a Subscriber Permanent Identifier (SUPI), a Subscriber Concealed Identifier (SUCI), a Mobile Subscriber International ISDN/PSTN number (MSISDN), a Domain Name, and a serial number and/or a character string generated by the first network element. The serial number and/or the character string is in one-to-one correspondence to the user ID or contents of the PSI parameter.

The user ID is not a SUPI.

In step 3A02, the first network element inquires a SUPI value corresponding to the user ID from a second network element.

The second network element has a subscription identifier de-concealing function (SIDF). For example, the second network element may be a Session Management Function (SMF) network element, and the present disclosure is not limited to this.

In step 3A03, the first network element inquires the terminal policy from a third network element using the SUPI and/or the unique ID.

The third network element is a core network data storage network element.

It can be seen that in the embodiment of the present disclosure, the first network element of the network device firstly receives the first information from the terminal, and secondly inquires the SUPI value corresponding to the user ID in the first information from the second network element, and at last uses the SUPI and/or the unique ID to inquire the terminal policy from the third network element. It is clear that since the first information transmitted between the first network element and the terminal does not directly include any SUPI for indicating an identifier of the terminal, the first information can be prevented from being stolen and directly utilized during transmission of the first information, which is beneficial to improving the safety of the interaction of information between a network side and the terminal in the inquiring of the terminal policy.

Figure 3B:
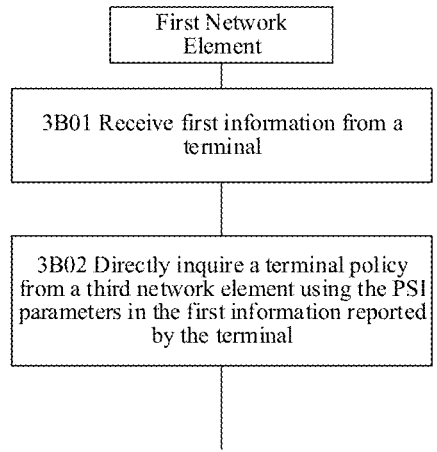
FIG. 3B is a schematic flowchart of a method for transmitting terminal information according to an embodiment of the present disclosure.

Correspondingly with the embodiments in FIGS. 2A and 3A, FIG. 3B shows a method for transmitting terminal information according to an embodiment of the present disclosure. The method is applied in a network device in the foregoing exemplary communication system, and the network device includes a first network element. The method includes the following steps:

In step 3B01, the first network element receives first information from a terminal.

The first information includes a list of policy section identifiers (PSIs), and each PSI parameter in the PSI list is represented by a user identifier (ID) and a unique ID. The first information alternatively includes a user ID and a PSI list, and each PSI parameter in the PSI list is represented by a unique ID. PSI parameter(s) in the PSI list is(are) globally unique; or PSI parameter(s) in the PSI list is(are) unique within a PLMN.

The user ID or the PSI parameter include any one of a Subscriber Permanent Identifier (SUPI), a Subscriber Concealed Identifier (SUCI), a Mobile Subscriber International ISDN/PSTN number (MSISDN), a Domain Name, and a serial number and/or a character string generated by the first network element. The serial number and/or the character string is in one-to-one correspondence to the user ID or content of the PSI parameter.

The user ID is not a SUPI.

In step 3B02, the first network element directly inquires the terminal policy from a third network element using the PSI parameter in the first information reported by the terminal.

The third network element is a core network data storage network element.

It can be seen that in the embodiment of the present disclosure, the first network element of the network device firstly receives the first information from the terminal, and secondly uses the PSI parameter in the first information reported by the terminal to directly inquire the terminal policy from the third network element. It can be seen that since the PSI parameter in the first information do not directly include any SUPI, the first information can be prevented from being stolen and directly utilized during transmission of the first information, which is beneficial to improving the safety of the interaction of information between a network side and the terminal in the inquiring of the terminal policy.

Figure 3C:
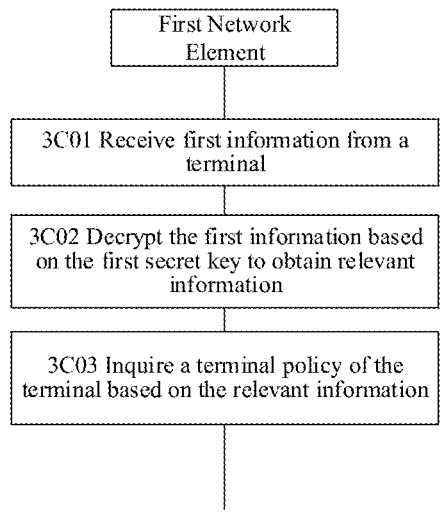
FIG. 3C is a schematic flowchart of a method for transmitting terminal information according to an embodiment of the present disclosure.

Correspondingly with the embodiments in FIGS. 2A and 3A, FIG. 3C shows a method for transmitting terminal information according to an embodiment of the present disclosure. The method is applied in a network device in the foregoing exemplary communication system, and the network device includes a first network element. The method includes the following steps:

In step 3C01, the first network element receives first information from a terminal.

The first information is data transmitted to the first network element by the terminal, and a part or all of the data is encrypted by a first secret key.

In step 3C02, the first network element decrypts and/or checks integrity based on the first information to obtain first content.

The first content includes PSI relevant information, or specific content of a UE policy, and an example in which the first content includes the PSI relevant information will be described.

In step 3C03, the first network element inquires a terminal policy based on the first content.

The first secret key or a second secret key is generated by a third secret key via a preset algorithm. The third secret key is sent to the terminal by a fourth network element. The fourth network element is an authentication server function (AUSF) network element on a network side.

The first secret key is pre-configured at the first network element and the terminal. The first network element is alternatively a policy control function (PCF) network element.

It can be seen that in the embodiment of the present disclosure, the first network element of the network device firstly receives the first information from the terminal, and secondly decrypts it based on the first secret key to obtain relevant information, and at last inquires the terminal policy of the terminal based on the relevant information. It can be seen that since the first information is encrypted by the first secret key, the first information can be prevented from being stolen and directly utilized during transmission of the first information, which is beneficial to improving the safety of the interaction of information between the network side and the terminal in the inquiring of the terminal policy.

Correspondingly with the embodiments in FIGS. 2A and 3A-3C, FIG. 4A shows a method for transmitting terminal information according to an embodiment of the present disclosure. The method is applied in a terminal in the foregoing exemplary communication system. The method includes the following steps:

In step 4A01, the terminal receives second information from a first network element.

The first network element is a network element in a network device.

The second information is used to indicate a terminal policy stored by the terminal, and includes non-plaintext contents. The non-plaintext contents specifically indicate that contents that are included in the second information and are indicative of a device identifier (corresponding to a user ID) of the terminal are non-plaintext identification information. The non-plaintext identification information specifically can be encrypted information (which is encrypted in the form of SUCI or encrypted by other secret keys such as a first secret key and/or is under integrity protection using a second secret key) or identification information in other format that is in direct association with the terminal policy and that does not directly contain the user ID (e.g. SUPI).

In step 4A02, the terminal inquires the terminal policy based on the second information.

It can be seen that in the embodiment of the present disclosure, the terminal firstly receives the first information from the first network element of the network device, and secondly inquires the terminal policy according to the second information. Since the second information are non-plaintext contents, the second information can be prevented from being illegally stolen and directly utilized during the transmission of the second information between the network terminal and the terminal, which is beneficial to improving the safety of the interaction of information between the network side and the terminal in the inquiring of the terminal policy.

In a possible example, the second information includes a policy section identifier (PSI) list, and each PSI parameter in the PSI list is represented by a user identifier (ID) and a unique ID.

In a possible example, the second information includes a PSI list, and each PSI parameter in the PSI list is represented by a PLMN ID and a unique ID.

In a possible example, the second information includes a user ID and a PSI list, and each PSI parameter in the PSI list is represented by a unique ID.

In this possible example, the terminal stores the terminal policy according to a correspondence between the PLMN ID and a PSI.

In a roaming scenario, an hPCF of a home location sends to a vPCF a policy, in which a PLMN ID and its corresponding PSI list of the home location are included. In the meanwhile, the vPCF adds a policy of a visited place by itself and forms a PLMN ID and its corresponding PSI list of the visited place. The vPCF then puts the two groups of PLMN IDs and their corresponding PSI lists in one message and sends them to the terminal.

In a possible example, PSI parameter(s) in the PSI list is(are) globally unique; or PSI parameter(s) in the PSI list is(are) unique within a PLMN.

In a possible example, the user ID or the PSI parameter(s) includes any one of a Subscriber Permanent Identifier (SUPI), a Subscriber Concealed Identifier (SUCI), a Mobile Subscriber International ISDN/PSTN number (MSISDN), a Domain Name, and a serial number and/or a character string generated by the first network element. The serial number and/or the character string is in one-to-one correspondence to the user ID or content of the PSI parameter.

In a possible example, when the user ID is not SUPI, the method further includes: inquiring, by the terminal, a SUPI value corresponding to the user ID from the second network element.

In a possible example, the second network element has an identifier de-concealing function.

In a possible example, inquiring, by the terminal, the terminal policy based on the second information includes: inquiring, by the terminal, the terminal policy from a third network element using the SUPI and/or the unique ID.

In a possible example, inquiring, by the terminal, the terminal policy based on the second information includes: directly inquiring, by the terminal, the terminal policy from the third network element using the PSI parameter in the second information issued by the first network element.

In a possible example, the third network element is a core network data storage network element.

In a possible example, the second information is data transmitted to the terminal by the first network element, and a part or all of the data is encrypted by a first secret key and/or is under integrity protection using the second secret key.

In a possible example, the method further includes decrypting and/or checking integrity, by the terminal, based on the second information to obtain second content.

In a possible example, the method further includes inquiring the terminal policy, by the terminal, based on the second content.

In a possible example, the first secret key or the second secret key is generated by a third secret key via a preset algorithm.

In a possible example, the third secret key is sent to the terminal by a fourth network element.

In a possible example, the fourth network element is an authentication server function (AUSF) network element on the network side.

In a possible example, the first secret key is pre-configured at the first network element and the terminal.

In a possible example, the first network element is a policy control function (PCF) network element.

In a possible example, receiving, by the terminal, the second information from the first network element includes receiving, by the terminal, second information sent by the first network element according to mapping relationship information, which includes a correspondence between the user identifiers and the PSI parameters.

In a possible example, each of the user identifiers corresponds to at least one of the PSI parameters in the mapping relationship information.

In a possible example, one PSI parameter merely corresponds to one user identifier in the mapping relationship information.

Figure 4A:
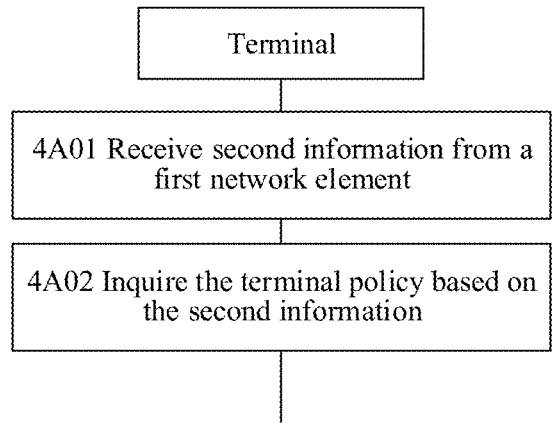
FIG. 4A is a schematic flowchart of a method for transmitting terminal information according to an embodiment of the present disclosure.
Figure 4B:
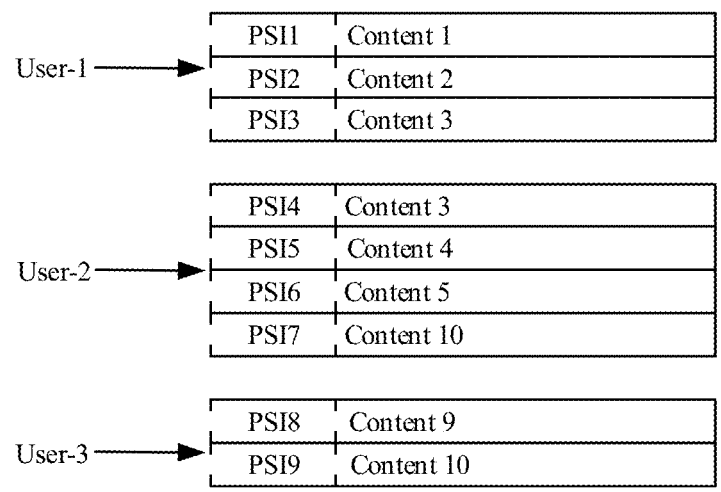
FIG. 4B is a schematic diagram of a correspondence between a user identifier and a PSI parameter according to an embodiment of the present disclosure.

For example, as shown in FIG. 4B, it is assumed that 3 user identifiers are included, which are respectively User-1, User-2 and User-3, and 10 PSI parameters are included, which are respectively PSI1, PSI2, PSI3, PSI4, PSI5, PSI6, PSI7, PSI8 and PSI9. PSI1 is used to indicate content 1 of the UE policy, PSI2 is used to indicate content 2 of the UE policy, PSI3 is used to indicate content 3 of the UE policy, PSI4 is used to indicate content 3 of the UE policy, PSI5 is used to indicate content 4 of the UE policy, PSI6 is used to indicate content 5 of the UE policy, PSI7 is used to indicate content 10 of the UE policy, PSI8 is used to indicate content 9 of the UE policy, and PSI9 is used to indicate content 10 of the UE policy. A mapping relationship between the user identifiers and the PSI parameters may be that User-1 corresponds to PSI1, PSI2 and PSI3, and User-2 corresponds to PSI4, PSI5, PSI6 and PSI7, and User-3 corresponds to PSI8 and PSI9.

The correspondence between the user identifiers and the PSI parameters may be stored on the network side.

In a possible example, one PSI parameter at least corresponds to one user identifier in the mapping relationship information.

Figure 4C:
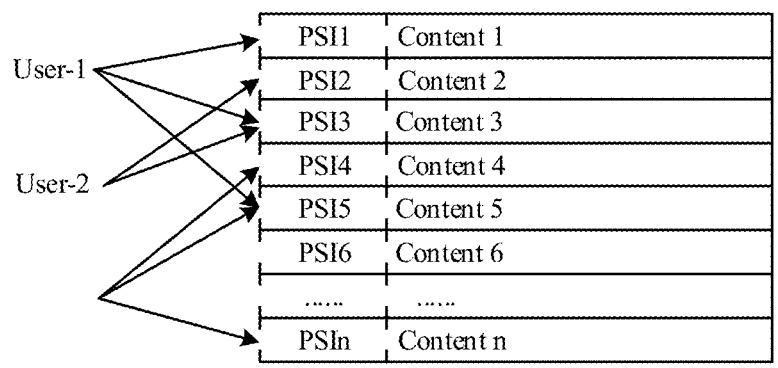
FIG. 4C is a schematic diagram of another correspondence between a user identifier and a PSI parameter according to an embodiment of the present disclosure.
Figure 4D:
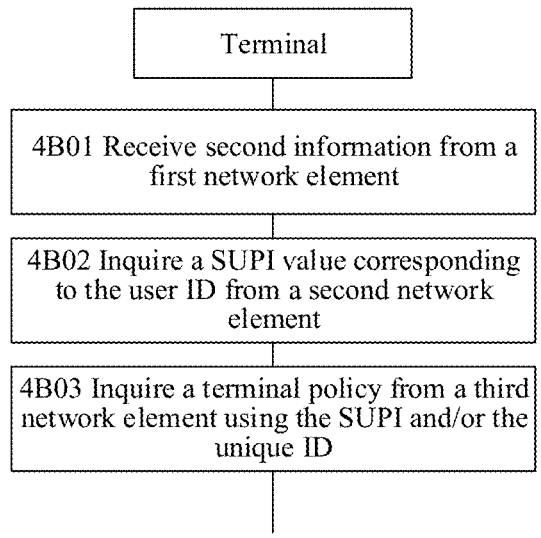
FIG. 4D is a schematic flowchart of another method for transmitting terminal information according to an embodiment of the present disclosure.
Figure 4E:
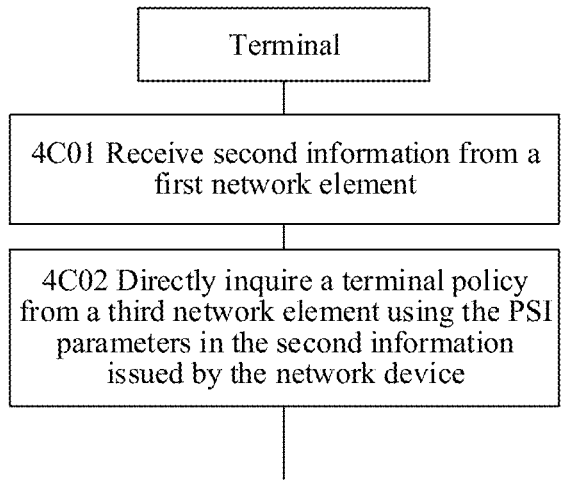
FIG. 4E is a schematic flowchart of another method for transmitting terminal information according to an embodiment of the present disclosure.
Figure 4F:
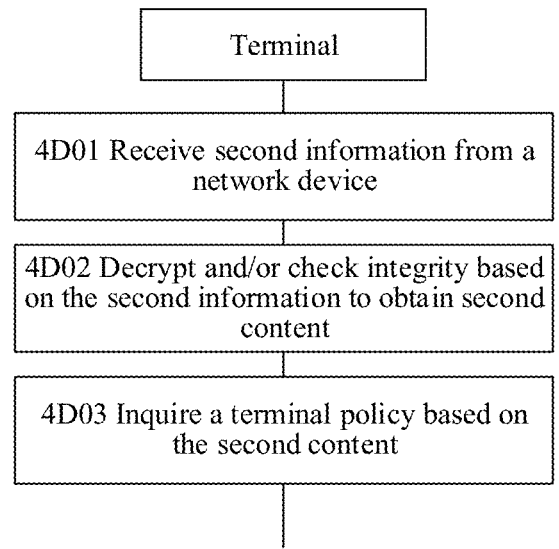
FIG. 4F is a schematic flowchart of another method for transmitting terminal information according to an embodiment of the present disclosure.

For example, as shown in FIG. 4C, it is assumed that 3 user identifiers are included, which are respectively User-1, User-2 and User-3, and n (n is a positive integer) PSI parameters are included, which are respectively PSI1, PSI2, PSI3 . . . PSIn. PSI1 is used to indicate content 1 of the UE policy, PSI2 is used to indicate content 2 of the UE policy, PSI3 is used to indicate content 3 of the UE policy, and PSI4 is used to indicate content 3 of the UE policy, and so on, and PSIn is used to indicate content n of the UE policy. The correspondence between the user identifiers and the PSI parameters may be that User-1 corresponds to PSI1, PSI3 and PSI5, User-2 corresponds to PSI2 and PSI3, and User-3 corresponds to PSI4, PSI5 and PSIn.

The correspondence between the user identifiers and the PSI parameters may be stored on the network side.

Correspondingly with the embodiments in FIGS. 2A, 3A-3C and 4A, FIG. 4D shows a method for transmitting terminal information according to an embodiment of the present disclosure. The method is applied in a terminal in the foregoing exemplary communication system, and includes the following steps:

In step 4B01, the terminal receives second information from a first network element.

The second information includes a policy section identifier (PSI) list, and each PSI parameter in the PSI list is represented by a user identifier (ID) and a unique ID. The second information alternatively includes a user ID and a PSI list, and each PSI parameter in the PSI list is represented by a unique ID. PSI parameter(s) in the PSI list is(are) globally unique; or PSI parameter(s) in the PSI list is(are) unique within a PLMN.

The user ID or the PSI parameters include any one of a Subscriber Permanent Identifier (SUPI), a Subscriber Concealed Identifier (SUCI), a Mobile Subscriber International ISDN/PSTN number (MSISDN), a Domain Name, and a serial number and/or a character string generated by the first network element. The serial number and/or the character string is in one-to-one correspondence to the user ID or contents of the PSI parameters.

The user ID is not a SUPI.

In step 4B02, the terminal inquires a SUPI value corresponding to the user ID from a second network element.

The second network element has a subscription identifier de-concealing function (SIDF). For example, the second network element may be a Session Management Function (SMF) network element, and the present disclosure is not limited to this.

In step 4B03, the terminal inquires a terminal policy from a third network element using the SUPI and/or the unique ID.

The third network element is a core network data storage network element.

It can be seen that in the embodiment of the present disclosure, the terminal firstly receives the second information from a network device, and secondly inquires the SUPI value corresponding to the user ID in the second information from the second network element, and at last uses the SUPI and/or the unique ID to inquiry the terminal policy from the third network element. It can be seen that since the second information transmitted between the terminal and the network device does not directly include the SUPI for indicating an identifier of the terminal, the second information can be prevented from being stolen and directly utilized during transmission of the second information, which is beneficial to improving the safety of the interaction of information between a network side and the terminal in the inquiring of the terminal policy.

Correspondingly with the embodiments in FIGS. 2A, 3A-3C, 4A and 4D, FIG. 4E shows a method for transmitting terminal information according to an embodiment of the present disclosure. The method is applied in a terminal in the foregoing exemplary communication system, and includes the following steps:

In step 4C01, the terminal receives second information from a first network element.

The first network element is a network element in a network device.

The second information includes a policy section identifier (PSI) list, and each PSI parameter in the PSI list is represented by a user identifier (ID) and a unique ID. The second information alternatively includes a user ID and a PSI list, and each PSI parameter in the PSI list is represented by a unique ID. PSI parameter(s) in the PSI list is(are) globally unique; or PSI parameter(s) in the PSI list is(are) unique within a PLMN.

The user ID or the PSI parameters include any one of a Subscriber Permanent Identifier (SUPI), a Subscriber Concealed Identifier (SUCI), a Mobile Subscriber International ISDN/PSTN number (MSISDN), a Domain Name, and a serial number and/or a character string generated by the first network element. The serial number and/or the character string is in one-to-one correspondence to the user ID or contents of the PSI parameters.

The user ID is not a SUPI.

In step 4C02, the terminal directly inquires a terminal policy from a third network element using the PSI parameter(s) in the second information issued by the network device.

The third network element is a core network data storage network element.

It can be seen that in the embodiment of the present disclosure, the terminal firstly receives the second information issued by the network device, and secondly uses the PSI parameter(s) in the second information to directly inquire the terminal policy from the third network element. It can be seen that since the PSI parameter(s) in the second information does(do) not directly include the SUPI, the second information can be prevented from being stolen and directly utilized during transmission of the second information, which is beneficial to improving the safety of the interaction of information between a network side and the terminal in the inquiring of the terminal policy.

Correspondingly with the embodiments in FIGS. 2A, 3A-3C and 4A-4E, FIG. 4F shows a method for transmitting terminal information according to an embodiment of the present disclosure. The method is applied in a terminal in the foregoing exemplary communication system, and includes:

In step 4D01, the terminal receives second information from a network device.

The second information is data transmitted to a first network element by the terminal, and a part or all of the data is encrypted by a first secret key.

The first secret key or a second secret key is generated by a third secret key via a preset algorithm. The third secret key is sent to the terminal by a fourth network element. The fourth network element is an authentication server function (AUSF) network element on a network side.

The first secret key is pre-configured at the first network element and the terminal. Alternatively, the first network element is a policy control function (PCF) network element.

In step 4D02, the terminal decrypts and/or checks integrity based on the second information to obtain second content.

The first content includes PSI relevant information, or specific content of a UE policy, and an example in which the first content includes the PSI relevant information will be described.

In step 4D03, the terminal inquires a terminal policy based on the second content.

It can be seen that in the embodiment of the present disclosure, the terminal firstly receives the second information from the network device, and secondly decrypts and/or checks the integrity based on the second information to obtain the second content, and finally inquires the terminal strategy based on the second content. Since decryption is performed and/or integrity is checked based on the second information to obtain the second content of plaintext, so as to inquire the terminal policy, the second information can be prevented from being stolen and directly utilized during transmission of the second information, which is beneficial to improving the safety of the interaction of information between the network side and the terminal in the inquiring of the terminal policy.

Figure 5:
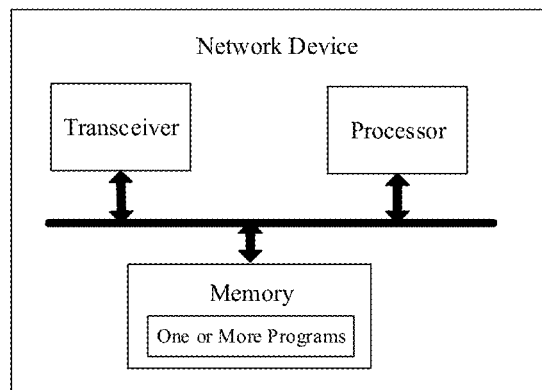
FIG. 5 is a structure diagram of a network device according to an embodiment of the present disclosure.

Correspondingly with the above-described embodiments, FIG. 5 is a schematic structural diagram of a network device according to an embodiment of the present disclosure. As shown in the figure, the network device includes a processor, a memory, a communication interface and one or more programs. The one or more programs are stored in the memory, and are configured to be executed by the processor. The one or more programs include instructions for performing the following steps.

First information is received from a terminal; the first information is used to indicate a terminal policy stored in the terminal, and is content in the form of non-plaintext. The content in the form of non-plaintext specifically indicates that the content that is included in the first information and is indicative of a device identifier (corresponding to a user ID) of the terminal is non-plaintext identification information. The non-plaintext identification information specifically can be encrypted information (which is encrypted in the form of SUCI or encrypted by other secret keys such as a first secret key) or identification information that is in direct association with the terminal policy and that does not directly contain the user ID (e.g. SUPI).

The terminal policy is inquired based on the first information.

It can be seen that in the embodiment of the present disclosure, a first network element of the network device firstly receives the first information from the terminal, and secondly inquires the terminal policy based on the first information. Since the first information is the content in the form of non-plaintext, the first information can be prevented from being illegally stolen and directly utilized during transmission of the first information between the first network element and the terminal, which is beneficial to improving the safety of the interaction of information between a network side and the terminal in the inquiring of the terminal policy.

In a possible example, the first information includes a policy section identifier (PSI) list, and each PSI parameter in the PSI list is represented by a user identifier (ID) and a unique ID.

In a possible example, the first information includes a user ID and a PSI list, and each PSI parameter in the PSI list is represented by a unique ID.

In a possible example, PSI parameter(s) in the PSI list is(are) globally unique; or the PSI parameter(s) in the PSI list is(are) unique within the PLMN.

In a possible example, the user ID or the PSI parameters include any one of a Subscriber Permanent Identifier (SUPI), a Subscriber Concealed Identifier (SUCI), a Mobile Subscriber International ISDN/PSTN number (MSISDN), a Domain Name, and a serial number and/or a character string generated by the first network element. The serial number and/or the character string is in one-to-one correspondence to the user ID or contents of the PSI parameters.

In a possible example, when the user ID is not SUPI, the programs further include instructions to perform an operation of inquiring a SUPI value corresponding to the user ID from the second network element.

In a possible example, the second network element has a subscription identifier de-concealing function (SIDF).

In a possible example, when the first network element inquires the terminal policy based on the first information, the instructions in the programs are specifically configured to perform an operation of using the SUPI and/or the unique ID to inquire the terminal policy from the third network element.

In a possible example, when the user ID is not SUPI, and the first network element inquires the terminal policy based on the first information, the instructions in the programs are specifically configured to perform an operation of using the PSI parameters in the first information reported by the terminal to directly inquire the terminal policy from the third network element.

In a possible example, the third network element is a core network data storage network element.

In a possible example, the first information is data transmitted to the first network element by the terminal, and a part or all of the data is encrypted by the first secret key; when the terminal policy is inquired based on the first information, the instructions in the programs are specifically configured to perform an operation of decrypting the first information based on the first secret key to obtain relevant information, and inquiring the terminal policy of the terminal based on the relevant information.

In a possible example, the first secret key is generated by a second secret key through a preset algorithm.

In a possible example, the second secret key is provided by a fourth network element, and sent to the terminal by an Access and Mobility Management Function (AMF) network element, and the fourth network element is an authentication server function (AUSF) network element on the network side.

In a possible example, the first secret key is pre-configured for the terminal by the network side.

In a possible example, the first network element is a policy control function (PCF) network element.

Figure 6:
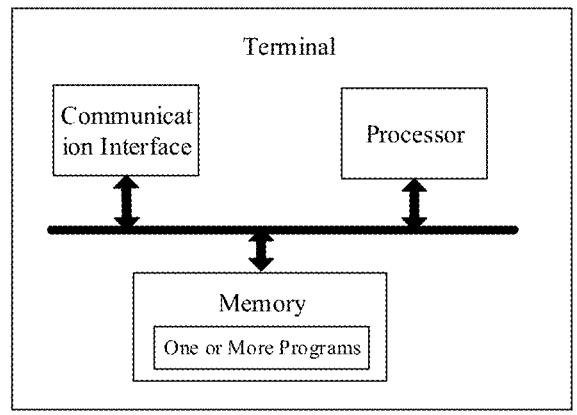
FIG. 6 is a structure diagram of a terminal according to an embodiment of the present disclosure.

Correspondingly with the above-described embodiments, FIG. 6 is a schematic structural diagram of a terminal according to an embodiment of the present disclosure. As shown in the figure, the terminal includes a processor, a memory, a communication interface and one or more programs. The one or more programs are stored in the memory, are configured to be executed by the processor, and include instructions for performing the following steps:

Second information is received from a network device. The second information is also used to indicate a terminal policy stored in the terminal, and the second information is content in a form of non-plaintext. The content in the form of non-plaintext specifically indicate that content that is included in the second information and is indicative of a device identifier (corresponding to a user ID) of the terminal is non-plaintext identification information. The non-plaintext identification information specifically can be encrypted information (which is encrypted in the form of SUCI or encrypted by other secret keys such as a first secret key and/or is under integrity protection of a second secret key) or identification information that is in direct association with the terminal policy and that does not directly contain the user ID (e.g. SUPI).

The terminal policy is inquired based on the second information.

It can be seen that in the embodiment of the present disclosure, the terminal firstly receives the second information from the network device, and secondly inquires the terminal policy based on the second information. Since the second information is content d in the form of non-plaintext, the second information can be prevented from being illegally stolen and directly utilized during transmission of the second information between a first network element and the terminal, which is beneficial to improving the safety of the interaction of information between a network side and the terminal in the inquiring of the terminal policy.

In a possible example, the second information includes a policy section identifier (PSI) list, and each PSI parameter in the PSI list is represented by a user identifier (ID) and a unique ID.

In a possible example, the second information includes a user ID and a PSI list, and each PSI parameter in the PSI list is represented by a unique ID.

In a possible example, PSI parameter(s) in the PSI list is(are) globally unique; or PSI parameter(s) in the PSI list is(are) unique within a PLMN.

In a possible example, the user ID or the PSI parameters include any one of a Subscriber Permanent Identifier (SUPI), a Subscriber Concealed Identifier (SUCI), a Mobile Subscriber International ISDN/PSTN number (MSISDN), a Domain Name, and a serial number and/or a character string generated by the first network element. The serial number and/or the character string is in one-to-one correspondence to the user ID or contents of the PSI parameters.

In a possible example, when the user ID is not SUPI, the programs further include instructions to perform an operation of inquiring a SUPI value corresponding to the user ID from a second network element.

In a possible example, the second network element has an identifier de-concealing function.

In a possible example, when the terminal policy is inquired based on the second information, the instructions in the programs are specifically configured to perform an operation of using the SUPI and/or the unique ID to inquire the terminal policy from the third network element.

In a possible example, when the terminal policy is inquired based on the second information, the instructions in the programs are specifically configured to perform an operation of inquiring the terminal policy from the third network element using the PSI parameters in the second information issued by the first network element.

In a possible example, the third network element is a core network data storage network element.

In a possible example, the second information is data transmitted to the terminal by the first network element, and a part or all of the data is encrypted by a first secret key and/or is under integrity protection using the second secret key.

In a possible example, the programs further include instructions to perform an operation of decrypting and/or checking integrity based on the second information to obtain second content.

In a possible example, the programs further include instructions to perform an operation of inquiring the terminal policy based on the second content.

In a possible example, the first secret key or the second secret key is generated by a third secret key via a preset algorithm.

In a possible example, the third secret key is sent to the terminal by a fourth network element.

In a possible example, the fourth network element is an authentication server function (AUSF) network element on the network side.

In a possible example, the first secret key is pre-configured at the first network element and the terminal.

In a possible example, the first network element is a policy control function (PCF) network element.

The solutions of the embodiments of the present disclosure are described above mainly from the perspective of the interactions among the respective network elements. It can be understood that the terminal and the network device include corresponding hardware structures and/or software modules for performing respective functions in order to implement the above-described functions. Those skilled in the art will readily appreciate that, as can be seen from the units and algorithm steps of the various examples described in the embodiments disclosed herein, the present disclosure can be carried out by hardware or the combination of hardware and computer software. Whether a function is implemented by hardware or by driving hardware using computer software depends on specific applications and design constraints of the technical solutions. For each of the particular applications, a person skilled in the art can use different methods to implement the described functions, but such implementations should not be considered as exceeding the scope of the application.

In the embodiments of the present disclosure, function units of the terminal and the network device may be divided according to the examples of the foregoing methods. For example, the function units may be divided based on their functions, or two or more functions may be integrated into one processing unit. The above integrated units may be implemented by hardware or a software program module. It should be noted that the division of the units in the embodiments of the present disclosure is illustrative, and it is only a kind of logical function division. In practice, other division manners may be used.

Figure 7:
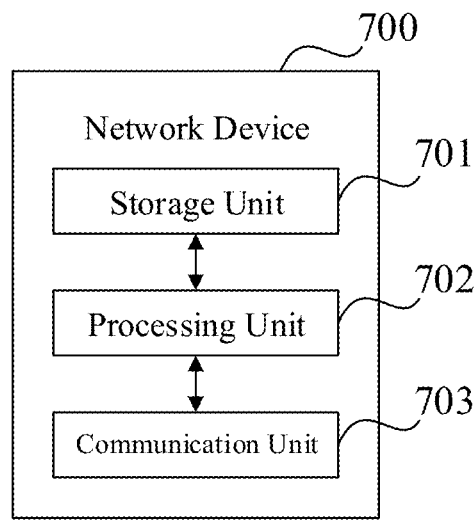
FIG. 7 is a structure diagram of a network device according to an embodiment of the present disclosure.

When integrated units are used, FIG. 7 shows a block diagram of a possible construction of function units of the network device in the above embodiments. A network device 700 includes a processing unit 702 and a communication unit 703. The processing unit 702 is used to control and manage actions of the network device. For example, the processing unit 702 is used to support the network device to perform steps 201 and 202 in FIG. 2A, steps 3A01, 3A02 and 3A03 in FIG. 3A, steps 3B01 and 3B02 in FIG. 3B, steps 3C01 to 3C03 in FIG. 3C and/or other procedures of technologies described herein. The communication unit 703 is used to support communication between the network device and other devices, for example communication between the network device and the terminal shown in FIG. 3C. The network device may further include a storage unit 701 used to store program codes and data of the network device.

The processing unit 702 can be a processor or a controller, for example a Central Processing Unit (CPU), a general-purpose processor, a Digital Signal Processor (DSP), an Application-Specific Integrated Circuit (ASIC), a Field Programmable Gate Array (FPGA) or other programmable logic devices, transistor logic devices, hardware components or any combination thereof. They can implement or carry out the various exemplary logical blocks, modules and circuits described with reference to the contents disclosed by the present disclosure. The processor may also be a combination of components that implement computing functions, for example, a combination of one or more microprocessors, a combination of a DSP and a microprocessor and the like. The communication unit 703 may be a transceiver, a transceiver circuit or the like and the storage unit 701 may be a memory.

The processing unit 702 is configured to receive first information from the terminal via the communication unit 703. The first information is used to indicate a terminal policy stored by the terminal, and the first information is content that is in the form of non-plaintext. The content in the form of non-plaintext specifically refers to that content that is included in the first information and is indicative of a device identifier (corresponding to a user ID) of the terminal is non-plaintext identification information. The non-plaintext identification information specifically can be encrypted information (which is encrypted in the form of SUCI or encrypted by other secret keys such as a first secret key) or identification information that is in direct association with the terminal policy and that does not contain the user ID (e.g. SUPI). The terminal policy is inquired based on the first information.

It can be seen that in this example a first network element of the network device firstly receives the first information from the terminal, and secondly inquires the terminal policy based on the first information. Since the first information is content in the form of non-plaintext, the first information can be prevented from being illegally stolen and directly utilized during transmission of the first information between the first network element and the terminal, which is beneficial to improving the safety of the interaction of information between the network side and the terminal in the inquiring of the terminal policy.

In a possible example, the first information includes a policy section identifier (PSI) list, and each PSI parameter in the PSI list is represented by a user identifier (ID) and a unique ID.

In a possible example, the first information includes a user ID and a PSI list, and each PSI parameter in the PSI list is represented by a unique ID.

In a possible example, PSI parameter(s) in the PSI list is(are) globally unique; or PSI parameter(s) in the PSI list is(are) unique within a PLMN.

In a possible example, the user ID or the PSI parameters include any one of a Subscriber Permanent Identifier (SUPI), a Subscriber Concealed Identifier (SUCI), a Mobile Subscriber International ISDN/PSTN number (MSISDN), a Domain Name, and a serial number and/or a character string generated by the first network element. The serial number and/or the character string is in one-to-one correspondence to the user ID or contents of the PSI parameters.

In a possible example, when the user ID is not a SUPI, the processing unit 702 is further configured to inquire, by the communication unit 703, a SUPI value corresponding to the user ID from a second network element.

In a possible example, the second network element has a subscription identifier de-concealing function (SIDF).

In a possible example, when the terminal policy is inquired based on the second information, the processing unit 702 is specifically configured to inquire the terminal policy by the communication unit 703 from a third network element using the SUPI and/or the unique ID.

In a possible example, when the user ID is not a SUPI and the terminal policy is inquired based on the first information, the processing unit 702 is specifically configured to directly inquire the terminal policy from the third network element using the PSI parameters in the first information reported by the terminal.

In a possible example, the third network element is a core network data storage network element.

In a possible example, the first information is data transmitted to the first network element by the terminal, and a part or all of the data is encrypted by the first secret key; and when the terminal policy is inquired based on the first information, the processing unit 702 is specifically configured to decrypt the first information according to the first secret key to obtain relevant information, and inquire the terminal policy of the terminal based on the relevant information.

In a possible example, the first secret key is generated by a second secret key through a preset algorithm.

In a possible example, the second secret key is provided by a fourth network element, and sent to the terminal by an Access and Mobility Management Function (AMF) network element and the fourth network element is an authentication server function (AUSF) network element on the network side.

In a possible example, the first secret key is pre-configured for the terminal by the network side.

In a possible example, the first network element is a policy control function (PCF) network element.

When the processing unit 702 is a processor, the communication unit 703 is a communication interface, and the storage unit 701 is a memory, the network device in the embodiments of the present disclosure may be the network device shown in FIG. 5.

Figure 8:
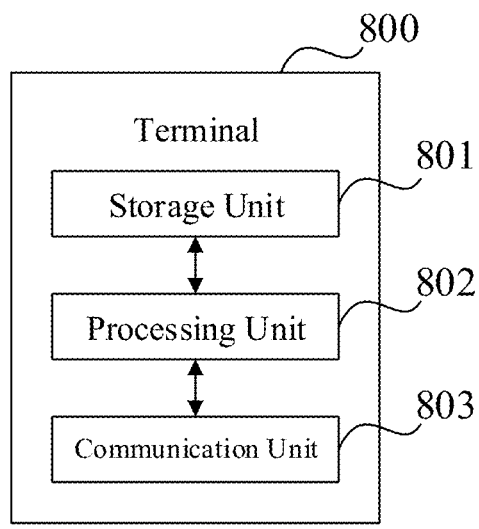
FIG. 8 is a structure diagram of a terminal according to an embodiment of the present disclosure.

When integrated units are used, FIG. 8 shows a block diagram of a possible construction of function units of the terminal in the above embodiments. A terminal 800 includes a processing unit 802 and a communication unit 803. The processing unit 802 is used to control and manage actions of the terminal. For example, the processing unit 802 is used to support the terminal to perform steps 4A01 and 4A02 in FIG. 4A, steps 4B01-4B03 in FIG. 4D, steps 4C01 and 4C02 in FIG. 4E, steps 4D01 to 4D03 in FIG. 4F and/or other procedures of technologies described herein. The communication unit 803 is used to support communication between the terminal and other devices, for example communication between the terminal and the network device shown in FIG. 5. The terminal may further include a storage unit 801 used to store program codes and data of the terminal.

The processing unit 802 can be a processor or a controller, for example a Central Processing Unit (CPU), a general-purpose processor, a Digital Signal Processor (DSP), an Application-Specific Integrated Circuit (ASIC), a Field Programmable Gate Array (FPGA) or other programmable logic devices, transistor logic devices, hardware components or any combination thereof. They can implement or carry out the various exemplary logical blocks, modules and circuits described by referring to the contents disclosed in the present disclosure. The processor may also be a combination of components that implement computing functions, for example, a combination of one or more microprocessors, a combination of a DSP and a microprocessor and the like. The communication unit 803 may be a transceiver, a transceiver circuit or the like and the storage unit 801 may be a memory.

The processing unit 802 is configured to receive second information from the network device via the communication unit 803. The second information is used to indicate a terminal policy stored by the terminal, and is content in the form of non-plaintext. The content in the form of non-plaintext specifically refer to that the content that is included in the second information and is indicative of a device identifier (corresponding to a user ID) of the terminal is non-plaintext identification information. The non-plaintext identification information specifically can be encrypted information (which is encrypted in the form of SUCI or encrypted by other secret keys such as a first secret key and/or is under integrity protection of a second secret key) or identifier information that is in direct association with the terminal policy and that does not contain the user ID (e.g. SUPI). The terminal policy is inquired by the communication unit 803 based on the second information.

It can be seen that in this example the terminal firstly receives the second information from the network device, and secondly inquires the terminal policy based on the second information. Since the second information is content that is not in the form of plaintext, the second information can be prevented from being illegally stolen and directly utilized during transmission of the second information between the first network element and the terminal, which is beneficial to improving the safety of the interaction of information between the network side and the terminal in the inquiring of the terminal policy.

In a possible example, the second information includes a policy section identifier (PSI) list, and each PSI parameter in the PSI list is represented by a user identifier (ID) and a unique ID.

In a possible example, the second information includes a user ID and a PSI list, and each PSI parameter in the PSI list is represented by a unique ID.

In a possible example, PSI parameter(s) in the PSI list is(are) globally unique; or PSI parameter(s) in the PSI list is(are) unique within a PLMN.

In a possible example, the user ID or the PSI parameters include any one of a Subscriber Permanent Identifier (SUPI), a Subscriber Concealed Identifier (SUCI), a Mobile Subscriber International ISDN/PSTN number (MSISDN), a Domain Name, and a serial number and/or a character string generated by the first network element. The serial number and/or the character string is in one-to-one correspondence to the user ID or contents of the PSI parameters.

In a possible example, when the user ID is not a SUPI, the processing unit 802 is further configured to inquire, by the communication unit 803, a SUPI value corresponding to the user ID from a second network element.

In a possible example, the second network element has an identifier de-concealing function.

In a possible example, when the terminal policy is inquired based on the second information, the processing unit 802 is specifically configured to inquire the terminal policy by the communication unit 803 from a third network element using the SUPI and/or the unique ID.

In a possible example, when the terminal policy is inquired based on the second information, the processing unit 802 is specifically configured to directly inquire, by the communication unit 803, the terminal policy from the third network element using the PSI parameters in the second information issued by the first network element.

In a possible example, the third network element is a core network data storage network element.

In a possible example, the second information is data transmitted to the terminal by the first network element, and a part or all of the data is encrypted by a first secret key and/or is under integrity protection using the second secret key.

In a possible example, the processing unit 802 is further configured to decrypt and/or check integrity based on the second information to obtain second content.

In a possible example, the processing unit 802 is further configured to inquire the terminal policy based on the second content.

In a possible example, the first secret key or the second secret key is generated by a third secret key via a preset algorithm.

In a possible example, the third secret key is sent to the terminal by a fourth network element.

In a possible example, the fourth network element is an authentication server function (AUSF) network element on the network side.

In a possible example, the first secret key is pre-configured at the first network element and the terminal.

In a possible example, the first network element is a policy control function (PCF) network element.

When the processing unit 802 is a processor, the communication unit 803 is a communication interface, and the storage unit 801 is a memory, the terminal in the embodiments of the present disclosure may be the terminal shown in FIG. 6.

An embodiment of the present disclosure further provides a computer readable storage medium storing computer programs for electronic data exchange, which cause a computer to perform all or part of the steps described from the perspective of the terminal in the above method embodiments.

An embodiment of the present disclosure further provides a computer readable storage medium storing computer programs for electronic data exchange, which cause a computer to perform all or part of the steps described from the perspective of the network device in the above method embodiments.

An embodiment of the present disclosure further provides a computer program product which includes a non-transitory computer readable storage medium storing computer programs which are operable to cause a computer to perform all or part of the steps described from the perspective of the terminal in the above method embodiments. The computer program product can be a software installation package.

An embodiment of the present disclosure further provides a computer program product which includes a non-transitory computer readable storage medium storing computer programs which are operable to cause a computer to perform all or part of the steps described from the perspective of the network device in the above method embodiments. The computer program product can be a software installation package.

The steps of the methods or algorithms described in the embodiments of the present disclosure are implemented in the form of hardware, or in the form of software instructions executed by a processor. The software instructions may be composed of corresponding software modules. The software modules may be stored in a Random Access Memory (RAM), a flash memory, a Read Only Memory (ROM), an Erasable Programmable ROM (EPROM), an Electrically EPROM (EEPROM), a register, a hard disk, a mobile hard disk, a compact disk read-only memory (CD-ROM) or any other types of storage mediums well-known in the art. An exemplary storage medium is coupled to the processor, and thus the processor is able to read information from the medium and write information into the medium. Of course, the storage medium can also be a part of the processor. The processor and the storage medium are located in an ASIC. Furthermore, the ASIC is located in an access network device, a target network device, or a core network device. Of course, the processor and the storage medium may be provided as separate components in the access network device, the target network device, or the core network device.

Those skilled in the art should appreciate that the functions described in the embodiments of the present disclosure may be implemented in whole or in part by software, hardware, firmware or any combination thereof in one or more of the above examples. When implemented in software, the functions may be implemented in whole or in part in the form of a computer program product which includes one or more computer instructions. When the computer program instructions are loaded and executed on a computer, the procedures or functions described in accordance with the embodiments of the present disclosure are generated in whole or in part. The computer is a general-purpose computer, a special-purpose computer, a computer network or other programmable devices. The computer instructions are stored in a computer readable storage medium, or transmitted from one computer readable storage medium to another. For example, the computer instructions are transmitted from one website, computer, server or data center to another website, computer, server or data center wiredly (e.g. a coaxial cable, an optical fiber, a Digital Subscriber Line (DSL)) or wirelessly (e.g. infrared, Wi-Fi, microwave etc.). The computer readable storage medium is any medium to which a computer can access or a data storage device such as a server that includes one or more media, a data center. The media is a magnetic medium (e.g. a floppy disk, a hard disk, a magnetic tape), an optical medium (e.g. a Digital Video Disc (DVD)), or a semiconductor medium (e.g. a Solid State Disk (SSD)).

The objectives, the technical solutions and advantageous effects of the embodiments of the present disclosure are described in detail in the above-mentioned specific embodiments. It should be understood that the foregoing descriptions are only exemplary embodiments of the present disclosure and are not intended to limit the scope of the embodiments of the present disclosure. Any changes, equivalent substitutions and modifications made based on the technical solutions of the embodiments of the present disclosure should fall within the scope of the embodiments of the present disclosure.

What is claimed is:

1. A method for transmitting terminal information, wherein the method is applied in User Equipment (UE), and the method comprises:
   determining, by the UE, first information; and
   sending, by the UE, the first information to a policy control function (PCF);
   wherein the first information is used to indicate a UE policy stored in the UE, and the first information comprises a policy section identifier (PSI) list comprising PSI parameters, and each of the PSI parameters in the PSI list comprises a Public Land Mobile Network (PLMN) ID and an ID under the PLMN, wherein the PLMN ID along with the ID under the PLMN in the each of the PSI parameters is corresponding to a section of the UE policy, and the ID under the PLMN is generated by the PCF.

2. The method of claim 1, wherein each of the PSI parameters comprises any one of a Subscriber Permanent Identifier (SUPI), a Subscriber Concealed Identifier (SUCI), a Mobile Subscriber International ISDN/PSTN number (MSISDN), a Domain Name, and a serial number and/or a character string generated by the PCF.

3. A method for transmitting terminal information, wherein the method is applied in User Equipment (UE), and comprises:
   receiving, by the UE, second information from a policy control function (PCF);
   wherein the second information is used to indicate a UE policy stored in the UE, and the second information comprises a policy section identifier (PSI) list comprising PSI parameters, and each of the PSI parameters in the PSI list comprises a Public Land Mobile Network (PLMN) ID and an ID under the PLMN, wherein the PLMN ID along with the ID under the PLMN in the each of the PSI parameters is corresponding to a section of the UE policy, and the ID under the PLMN is generated by the PCF.

4. The method of claim 3, wherein after the UE receives the second information from the PCF, the method further comprises:
   inquiring, by the UE, the UE policy based on the second information.

5. The method of claim 3, wherein the receiving, by the UE, second information from the PCF comprises:
   receiving, by the UE, the second information sent by the PCF according to mapping relationship information, which includes a correspondence between user identifiers and PSI parameters.

6. The method of claim 5, wherein each of the user identifiers corresponds to at least one of the PSI parameters in the mapping relationship information.

7. The method of claim 5, wherein one PSI parameter at least corresponds to one user identifier in the mapping relationship information.

8. User Equipment (UE), comprising:
- a processor;
- a memory storing instructions executable by the processor; and
- a transceiver;
- wherein the processor is configured to:
- determine first information; and
- send the first information to a policy control function (PCF);
- wherein the first information is used to indicate a UE policy stored in the UE, and the first information comprises a policy section identifier (PSI) list comprising PSI parameters, and each of the PSI parameters in the PSI list comprises a Public Land Mobile Network (PLMN) ID and an ID under the PLMN, wherein the PLMN ID along with the ID under the PLMN in the each of the PSI parameters is corresponding to a section of the UE policy, and the ID under the PLMN is generated by the PCF.

9. The UE of claim 8, wherein each of the PSI parameters comprises any one of a Subscriber Permanent Identifier (SUPI), a Subscriber Concealed Identifier (SUCI), a Mobile Subscriber International ISDN/PSTN number (MSISDN), a Domain Name, and a serial number and/or a character string generated by the PCF.

* * * * *